(12) United States Patent
Sun et al.

(10) Patent No.: US 12,260,744 B2
(45) Date of Patent: Mar. 25, 2025

(54) MOTION-SENSING IN-VEHICLE ALERTING METHOD, SYSTEM AND RELATED DEVICE

(71) Applicant: AAC ACOUSTIC TECHNOLOGIES (SHENZHEN) CO., LTD., Shenzhen (CN)

(72) Inventors: Shuyuan Sun, Shenzhen (CN); Yiming Meng, Shenzhen (CN); Hao Yin, Shenzhen (CN); Xin Zhang, Shenzhen (CN); Henglizi Zhang, Shenzhen (CN); Huan Ge, Shenzhen (CN); Xiang Huang, Shenzhen (CN)

(73) Assignee: AAC ACOUSTIC TECHNOLOGIES (SHENZHEN) CO., LTD., Shenzhen (CN)

( * ) Notice: Subject to any disclaimer, the term of this patent is extended or adjusted under 35 U.S.C. 154(b) by 125 days.

(21) Appl. No.: 18/323,402

(22) Filed: May 24, 2023

(65) Prior Publication Data
US 2024/0194037 A1     Jun. 13, 2024

Related U.S. Application Data

(63) Continuation of application No. PCT/CN2022/144186, filed on Dec. 30, 2022.

(30) Foreign Application Priority Data

Dec. 12, 2022  (CN) .......................... 202211600251.4

(51) Int. Cl.
G08B 21/00     (2006.01)
B60Q 9/00      (2006.01)
(Continued)

(52) U.S. Cl.
CPC ................. *G08B 6/00* (2013.01); *B60Q 9/00* (2013.01); *G06F 3/162* (2013.01)

(58) Field of Classification Search
USPC ........ 340/425.5, 428, 429, 426.14, 446–448, 340/534, 538.12, 538.14, 538.16, 539.23,
(Continued)

(56) References Cited

U.S. PATENT DOCUMENTS

9,189,899 B2 *  11/2015  Cook ................... G07C 5/0808
2007/0109111 A1 *  5/2007  Breed ................ G01C 21/3697
340/435
(Continued)

*Primary Examiner* — Daniel Previl
(74) *Attorney, Agent, or Firm* — W&G Law Group (57) ABSTRACT

Disclosed are a motion-sensing in-vehicle alerting method, a system, and a related device, which are applied to vehicles. The method includes steps of: obtaining, by a controller, an audio signal from an in-vehicle audio bus; performing an acoustic characteristics analysis on the audio signal, and extracting an acoustic waveform of the audio signal in a time domain waveform; performing an amplitude modulation on a sinusoidal signal of the acoustic waveform to obtain a modulated sinusoidal signal after amplitude modulation; obtaining, by the controller, a control signal indicating operational behavior information from an in-vehicle control bus, matching the control signal with the modulated sinusoidal signal according to a predetermined rule to generate a vibration signal, and transmitting the vibration signal to the excitation oscillator to achieve a vibration alert. The method of the present application not only enhances safety, but also provides the vibration alert, resulting in an improved user experience.

10 Claims, 4 Drawing Sheets

(51) Int. Cl.
*G06F 3/16* (2006.01)
*G08B 6/00* (2006.01)

(58) Field of Classification Search
USPC .................. 340/545.3–545.5, 566, 552–554
See application file for complete search history.

(56) References Cited

U.S. PATENT DOCUMENTS

| | | | |
|---|---|---|---|
| 2012/0209505 A1* | 8/2012 | Breed ................ | G01C 21/3697 |
| | | | 701/408 |
| 2012/0286957 A1* | 11/2012 | Frechette ............ | B60K 28/066 |
| | | | 340/575 |
| 2014/0253313 A1* | 9/2014 | Schoenberg ......... | B60N 2/0029 |
| | | | 340/457 |
| 2017/0166123 A1* | 6/2017 | Bahgat .............. | B60W 30/0953 |
| 2017/0197549 A1* | 7/2017 | Vladimerou .......... | B60W 30/08 |

\* cited by examiner

MOTION-SENSING IN-VEHICLE ALERTING METHOD, SYSTEM AND RELATED DEVICE

TECHNICAL FIELD

The present application relates to the field of automotive technology, in particular to a motion-sensing in-vehicle alerting method, a motion-sensing in-vehicle alerting system, an electrode device, and a computer-readable storage medium.

BACKGROUND

With the rapid development of automotive electronics, the technology updates in smart cabins have provided users with enhanced experiences. The audio system, as an important component of the smart cabin, has made significant progress, especially in multimedia entertainment. However, in terms of alerting functions such as in-vehicle prompts and system warnings, there hasn't been much noticeable change.

Most of the conventional technologies still rely on traditional and simplistic sound alerts, which do not match the multifunctional and intelligent nature of modern cabins.

However, these technologies have not achieved optimal alerting effects and suffer from poor control performance, resulting in subpar user experiences.

Therefore, it is necessary to provide a new motion-sensing in-vehicle alerting method, a system, and a device to address the above-mentioned technical problems.

SUMMARY

An objective of the present application is to provide a high-security, user-friendly motion-sensing in-vehicle alerting method, a motion-sensing in-vehicle alerting system, an electrode device, and a computer-readable storage medium, to address the above-mentioned technical problems.

In order to achieve the above-mentioned objective, in a first aspect, embodiments of the present application provide a motion-sensing in-vehicle alerting method, applied to a vehicle with an excitation oscillator fixed to a seat of the vehicle, comprising:
  obtaining, by a controller, an audio signal from an in-vehicle audio bus;
  performing an acoustic characteristics analysis on the audio signal, and extracting an acoustic waveform of the audio signal in a time domain waveform;
  performing an amplitude modulation on a sinusoidal signal of the acoustic waveform to obtain a modulated sinusoidal signal after amplitude modulation; and
  obtaining, by the controller, a control signal indicating operational behavior information from an in-vehicle control bus, matching the control signal with the modulated sinusoidal signal according to a predetermined rule to generate a vibration signal, and transmitting the vibration signal to the excitation oscillator to achieve a vibration alert.

In one embodiment, in the step of obtaining, by the controller, the audio signal from the in-vehicle audio bus, the audio signal comprises a vehicle alert tone and a system alert tone in the vehicle.

In one embodiment, the vehicle alert tone and the system alert tone comprise a notification alert tone, a system key tone, and a security alarm alert tone.

In one embodiment, the step of performing the acoustic characteristics analysis on the audio signal, and extracting the acoustic waveform of the audio signal in the time domain waveform comprises:
  performing an acoustic envelope analysis on the audio signal; and
  extracting an envelope waveform of the audio signal on the time domain waveform.

In one embodiment, in the step of extracting the envelope waveform of the audio signal on the time domain waveform, the extraction method satisfies the following expressions:

$$\text{Signal}_{Envelop}(t_0) = |\text{Signal}_{Audio}(t)|_{MAX}, t \in [t_0-\tau, t_0+\tau] \quad (1);$$

$$\text{Signal}_{Envelop}^{All\ Range}(t_0) = \text{Signal}_{Audio}(t), t \in [0, T] \quad (2);$$

wherein $\text{Signal}_{Envelop}(t_0)$ represents an audio signal envelope at moment t0;
  $\text{Signal}_{Audio}(t)$ represents the audio signal obtained from the in-vehicle audio bus by the controller;
  $\tau$ represents a sampling interval of the audio signal on the time domain waveform;
  $\text{Signal}_{Envelop}^{All\ Range}(t)$ represents the envelope waveform of the audio signal obtained from the in-vehicle audio bus by the controller on the time domain waveform; and
  T represents a total duration of the audio signal obtained from the in-vehicle audio bus by the controller.

In one embodiment, in the step of performing the amplitude modulation on the sinusoidal signal of the acoustic waveform to obtain the modulated sinusoidal signal after amplitude modulation, a method of amplitude modulation satisfies the following equation:

$$\text{Signal}_{mod}(f, t) = \text{Signal}_{sin}(f, t) * \frac{\text{Signal}_{Envelop}^{All\ Range}(t)}{\text{MAX}\left[\text{Signal}_{Envelop}^{All\ Range}(t)\right]}; \quad (3)$$

wherein $\text{Signal}_{mod}(f,t)$ represents the modulated sinusoidal signal after amplitude modulation;
  f represents an operating frequency band of the excitation oscillator;
  $\text{Signal}_{sin}(f,t)$ represents the sinusoidal signal before amplitude modulated; and
  MAX [ ] represents a maximum value operation.

In one embodiment, the excitation oscillator comprises a first excitation oscillator and a second excitation oscillator; the first excitation oscillator is fixed to one side of a bottom of the seat and the second excitation oscillator is fixed to the other side of the bottom of the seat; and the first excitation oscillator and the second excitation oscillator are electrically connected to an independent output channel of the controller, respectively.

In one embodiment, the excitation oscillator is one or more of a moving coil vibrator, a moving iron vibrator, and a piezoelectric ceramic vibrator.

In one embodiment, the vibration alert comprises a single-area vibration and a multi-area vibration;
  the single-area vibration is a vibration excited by one or more of the excitation oscillators; and
  the multi-area vibration is a vibration excited by different vibration signals transmitted to a plurality of the excitation oscillators.

In a second aspect, embodiments of the present application further provide a motion-sensing in-vehicle alerting system, applied to a vehicle with an excitation oscillator fixed to a seat of the vehicle, comprising an obtaining module, an extraction module, a modulation module, and a control module;
  the obtaining module is configured to obtain an audio signal from an in-vehicle audio bus by a controller;

the extraction module is configured to perform an acoustic characteristics analysis for the audio signal, and extract an acoustic waveform of the audio signal in a time domain waveform;

the modulation module is configured to perform an amplitude modulation for a sinusoidal signal of the acoustic waveform to obtain a modulated sinusoidal signal after amplitude modulation; and the control module is configured to obtain a control signal indicating operational behavior information from an in-vehicle control bus, match the control signal with the modulated sinusoidal signal according to a predetermined rule to generate a vibration signal, and transmit the vibration signal to the excitation oscillator to achieve a vibration alert.

In a third aspect, embodiments of the present application further provide an electronic device, comprising a processor and a memory, the memory having a computer program stored thereon executable by the processor; wherein the processor reads the computer program in the memory to perform the steps in the above-mention motion-sensing in-vehicle alerting method.

In a fourth aspect, embodiments of the present application further provide a computer-readable storage medium, wherein the computer-readable storage medium stores a computer program, which implements the steps in the above-mention motion-sensing in-vehicle alerting method when executed by the processor.

Compared to the related art, in the motion-sensing in-vehicle alerting method, the system, the electrode device, and the computer-readable storage medium of the present application, an audio signal is obtained from an in-vehicle audio bus by a controller. An acoustic characteristics analysis is performed on the audio signal, and an acoustic waveform of the audio signal in a time domain waveform is extracted. An amplitude modulation is performed on a sinusoidal signal of the acoustic waveform to obtain a modulated sinusoidal signal after amplitude modulation. A control signal indicating operational behavior information is obtained from an in-vehicle control bus by the controller. The control signal is matched with the modulated sinusoidal signal according to a predetermined rule to generate a vibration signal, and the vibration signal is transmitted to the excitation oscillator to achieve a vibration alert. The combination of vibration alert with auditory alert not only enhances safety, but also, in the case of multiple excitation oscillators, allows for vibration alerts that are better aligned with user behavior through control signals on the in-vehicle control bus, resulting in an improved user experience.

BRIEF DESCRIPTION OF THE DRAWINGS

In order to illustrate technical solutions of embodiments of the present application more clearly, the accompanying drawings required in the embodiments will be briefly introduced below. Obviously, the accompanying drawings in the following description are only some embodiments of the present application. For those of ordinary skill in the art, other accompanying drawings may also be obtained from these accompanying drawings without creative effort.

DETAILED DESCRIPTION OF THE EMBODIMENTS

The technical solutions in embodiments of the present application will be clearly and comprehensively described below. Obviously, the described embodiments are only a part of rather than all of the embodiments of the present application. Based on the embodiments of the present application, all other embodiments obtained by those of ordinary skill in the art without making creative labor fall within the protection scope of the present application.

The present application provides a motion-sensing in-vehicle alerting method. The motion-sensing in-vehicle alerting method is applied to a vehicle.

Figure 2:
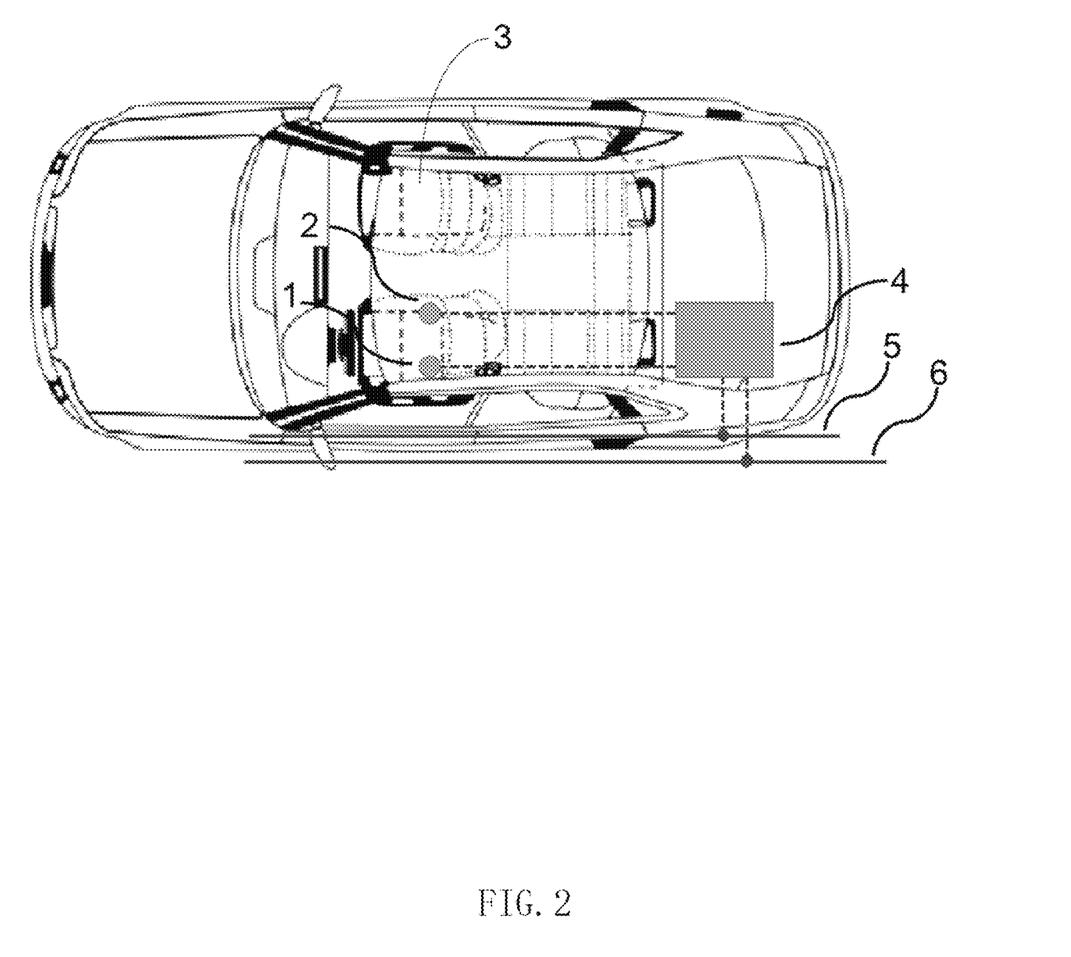
FIG. 2 is a diagram illustrating an in-vehicle arrangement of a vehicle according to an embodiment of the present application.

An excitation oscillator is preset, and the excitation oscillator is fixed to a seat of the vehicle. In an embodiment, the vehicle is provided with a main driver's seat, and the excitation oscillator is arranged at the main driver's seat. The excitation oscillator is not limited to fixedly arranged at an interior, a bottom position, or a backrest position of the seat 3.

Figure 1:
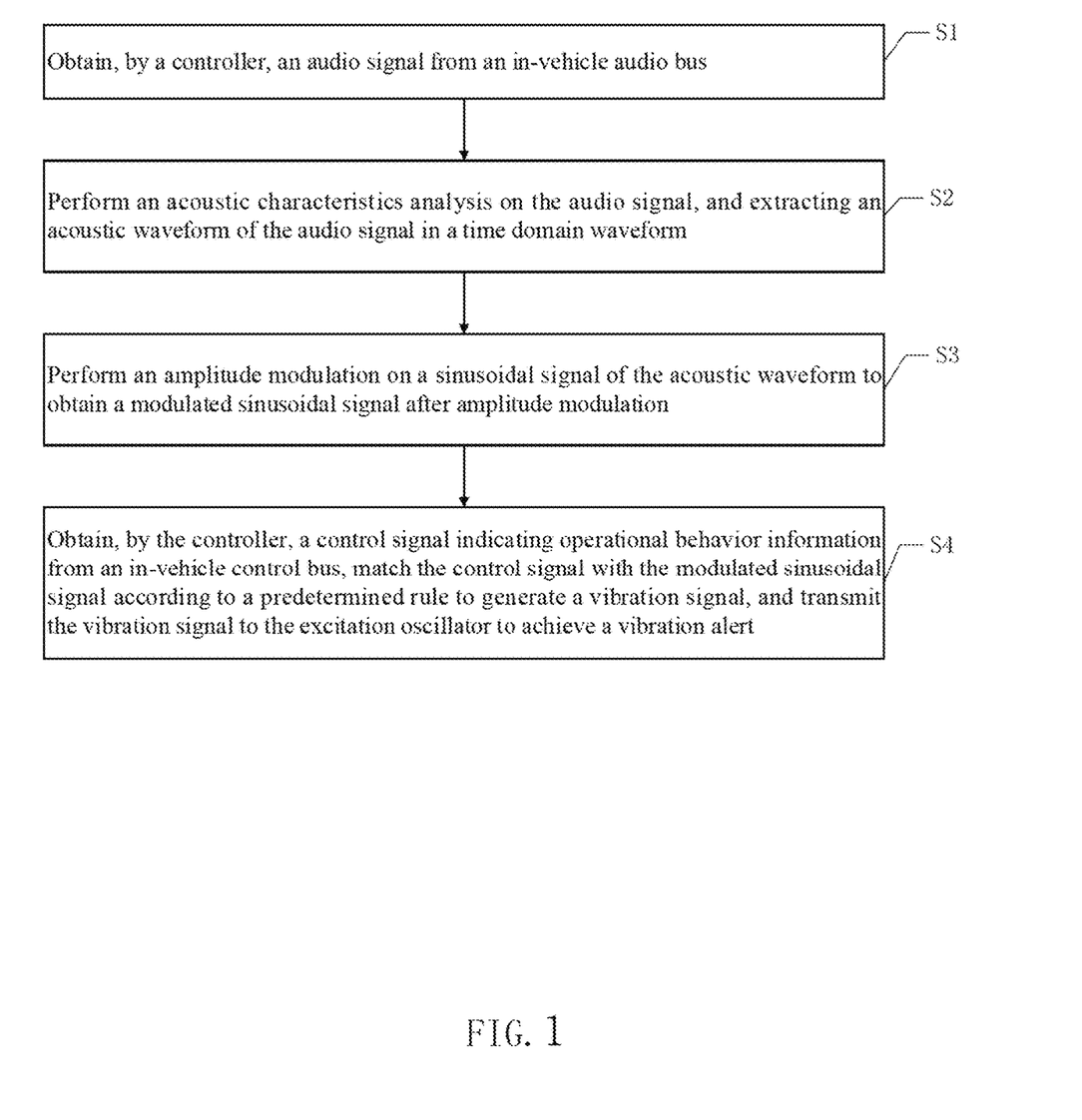
FIG. 1 is a flowchart of a motion-sensing in-vehicle alerting method according to an embodiment of the present application.

Referring to FIGS. 1-2, FIG. 1 is a flowchart of a motion-sensing in-vehicle alerting method according to an embodiment of the present application. FIG. 2 is a diagram illustrating an in-vehicle arrangement of a vehicle according to an embodiment of the present application.

The motion-sensing in-vehicle alerting method includes the following steps.

S1: an audio signal is obtained from the vehicle audio bus 5 by the controller 4.

S2: an acoustic characteristics analysis is performed on the audio signal, and an acoustic waveform of the audio signal in the time domain waveform is extracted.

S3: an amplitude modulation is performed on a sinusoidal signal of the acoustic waveform to obtain a modulated sinusoidal signal after amplitude modulation.

S4: a control signal indicating operation behavior information is obtained from an in-vehicle control bus 6 by the controller 4. The control signal is matched with the modulated sinusoidal signal according to predetermined rules to generate a vibration signal, and the vibration signal is transmitted to the excitation oscillator to achieve a vibration alert.

The vibration signal is a sinusoidal signal within an operating range of the excitation oscillator. In an embodiment, the sinusoidal signal may be a single frequency signal or a multi-frequency signal. Different frequency signals can be adapted to the use of different devices.

Specifically, an audio signal is obtained from the in-vehicle audio bus 5 by the controller 4. An acoustic characteristics analysis is performed on the audio signal, and an acoustic waveform of the audio signal in a time domain waveform is extracted. An amplitude modulation is performed on a sinusoidal signal of the acoustic waveform to obtain a modulated sinusoidal signal after amplitude modulation. A control signal indicating operational behavior information is obtained from the in-vehicle control bus 6 by the controller 4. The control signal is matched with the modulated sinusoidal signal according to a predetermined rule to generate a vibration signal, and the vibration signal is transmitted to the excitation oscillator to achieve a vibration alert. The combination of vibration alert with auditory alert not only enhances safety, but also, in the case of multiple excitation oscillators, allows for vibration alerts that are better aligned with user behavior through control signals on the in-vehicle control bus 6, resulting in an improved user experience.

In this embodiment, in step S1, the audio signal includes vehicle alert tones and system alert tones in the vehicle.

In this embodiment, the vehicle alert tone and the system alert tone include notification alert tones, system key tones, and security alarm alert tones. The vehicle alert tones and the system alert tones include, but are not limited to, notification tones, system key tones, and various types of security alarm tones, all of which are capable of generating tones.

In this embodiment, step S2 specifically includes the following sub-steps.

An acoustic envelope analysis is performed on the audio signal.

In acoustics, the acoustic envelope describes the changes in amplitude (energy) of a sound. Sound waves, like data packets transmitted above the Internet according to network protocols, are constantly sent out with efficient audio signal transmission.

The envelope waveform of the audio signal over the time domain waveform is extracted.

The waveform envelope in acoustics refers to the transients of the individual sound amplitude at the beginning and end of each musical note, which is also known as the envelope of the waveform. For instance, some instruments exhibit an immediate peak in amplitude at the onset of plucking, blowing, bowing, or striking, followed by a gradual decay, while others may exhibit the opposite, with a smaller initial amplitude that gradually increases and then decays. These changes in waveform envelope also affect the timbre of musical instruments, as any distortion in the natural envelope can result in timbral irregularities.

This allows for obtaining well-defined waveform envelopes of audio signals, facilitating signal processing of the envelope waveform.

In this embodiment, the generated vibration signal refers to the modulation of the amplitude of the vibration signal based on the envelope amplitude of audio signals such as vehicle alert tones and system alert tones in the time domain waveform.

In this embodiment, in the extraction of the envelope waveform of the audio signal in the time domain waveform, the extraction method satisfies the following expressions:

$$\text{Signal}_{Envelop}(t_0) = |\text{Signal}_{Audio}(t)|_{MAX}, t \in [t_0 - \tau, t_0 + \tau]. \quad (1)$$

$$\text{Signal}_{Envelop}^{All\ Range}(t_0) = \text{Signal}_{Audio}(t), t \in [0, T] \quad (2)$$

$\text{Signal}_{Envelop}(t_0)$ represents an audio signal envelope at moment t0.

$\text{Signal}_{Audio}(t)$ represents the audio signal obtained from the in-vehicle audio bus 5 by the controller 4.

| | represents an absolute value operation.

$\tau$ represents a sampling interval of the audio signal on the time domain waveform.

$\text{Signal}_{Envelop}^{All\ Range}(t)$ represents the envelope waveform of the audio signal obtained by the controller 4 from the in-vehicle audio bus 5 on the time domain waveform.

T represents the total duration of the audio signal obtained from the in-vehicle audio bus 5 by the controller 4.

By utilizing the expressions (1)-(2) mentioned above, the controller 4 is capable of obtaining the audio signal from the in-vehicle audio bus 5, and based on the acquired audio signal, the envelope waveform in the time domain waveform is extracted. Then, the sinusoidal signal of the envelope waveform is subjected to amplitude modulation, to obtain a modulated sinusoidal signal. The controller also obtains control signals from the in-vehicle control bus indicating operating behavior information. These control signals are matched with the modulated sinusoidal signal according to predetermined rules to generate vibration signals. Finally, the vibration signals are transmitted to the excitation oscillator to achieve the vibration alert.

In this embodiment, in step S3, the method of amplitude modulation satisfies the following equation:

$$\text{Signal}_{mod}(f, t) = \text{Signal}_{sin}(f, t) * \frac{\text{Signal}_{Envelop}^{All\ Range}(t)}{\text{MAX}\left[\text{Signal}_{Envelop}^{All\ Range}(t)\right]}. \quad (3)$$

$\text{Signal}_{mod}(f,t)$ represents the modulated sinusoidal signal after amplitude modulation;

f represents an operating frequency band of the excitation oscillator;

$\text{Signal}_{sin}(f,t)$ represents the sinusoidal signal before amplitude modulated; and MAX [ ] represents a maximum value operation.

After the amplitude is modulated by the above formula (3), a well modulated sinusoidal signal can be obtained, which facilitates adaptation to the operating frequency range of different excitation oscillators.

In this embodiment, there are a plurality of the excitation oscillators fixed in the seat 3. The plurality of excitation oscillators are fixed in an interior, a bottom position, or a backrest position of the seat 3. The plurality of excitation transducers with varying characteristics are employed to adapt to different operations.

In this embodiment, the excitation oscillators include a first excitation oscillator 1 and a second excitation oscillator 2. The first excitation oscillator 1 is fixed to one side of a bottom of the seat 3, and the second excitation oscillator 2 is fixed to the other side of the bottom of the seat 3. The first excitation oscillator 1 and the second excitation oscillator 2 are electrically connected to an independent output channel of the controller 4, respectively.

In one embodiment, a plurality of the excitation oscillators not only include the above-mentioned first excitation oscillator 1 and second excitation oscillator 2, but also may be 3, 4, 5, etc., according to the practical needs.

Specifically, the controller 4 obtains the control signal indicating operation behavior information from the in-vehicle control bus 6, to match the user behavior and adapt different vibration signals to transmit to different excitation oscillators for operation. The logical guidelines for matching the vibration signal to the user's operating behavior are not limited herein, but may be defined according to the audio strategy of the whole vehicle product.

For example, in the process of adapting to the user's left and right turn signal operation, when the user turns on the left turn signal, the vibration signal is only fed to the first excitation oscillator 1 on the left side. When the user turns on the right turn signal, the vibration signal is only fed to the second excitation oscillator 2 on the right side.

In this embodiment, the excitation oscillator is one or more of a moving coil-type vibrator, a moving iron-type vibrator, and a piezoelectric ceramic-type vibrator. Of course, the excitation oscillator is not limited to the moving coil vibrator, moving iron vibrator, and piezoelectric ceramic vibrator, but any vibrators capable of providing vibration functionality may be adopted.

In this embodiment, the vibration alert includes a single-area vibration and a multi-area vibration.

The single-area vibration refers to a vibration excited by one or more excitation oscillators.

The multi-area vibration refers to a vibration excited by different vibration signals transmitted to a plurality of the excitation oscillators.

The different vibration signals are vibration signals adapted according to the different user operation behaviors acquired.

The obtained different user operation behavior may be a user operation information signal read by the controller 4 of the excitation oscillators from the in-vehicle control bus 6, or a user operation information signal may be directly deactivated to the controller 4 of the excitation oscillators.

In this embodiment, the controller 4 is not limited to an external stand-alone amplifier shared with the audio system, the stand-alone amplifier that only independently controls the excitation oscillator or the integrated amplifier integrated into the vehicle host.

Figure 3:
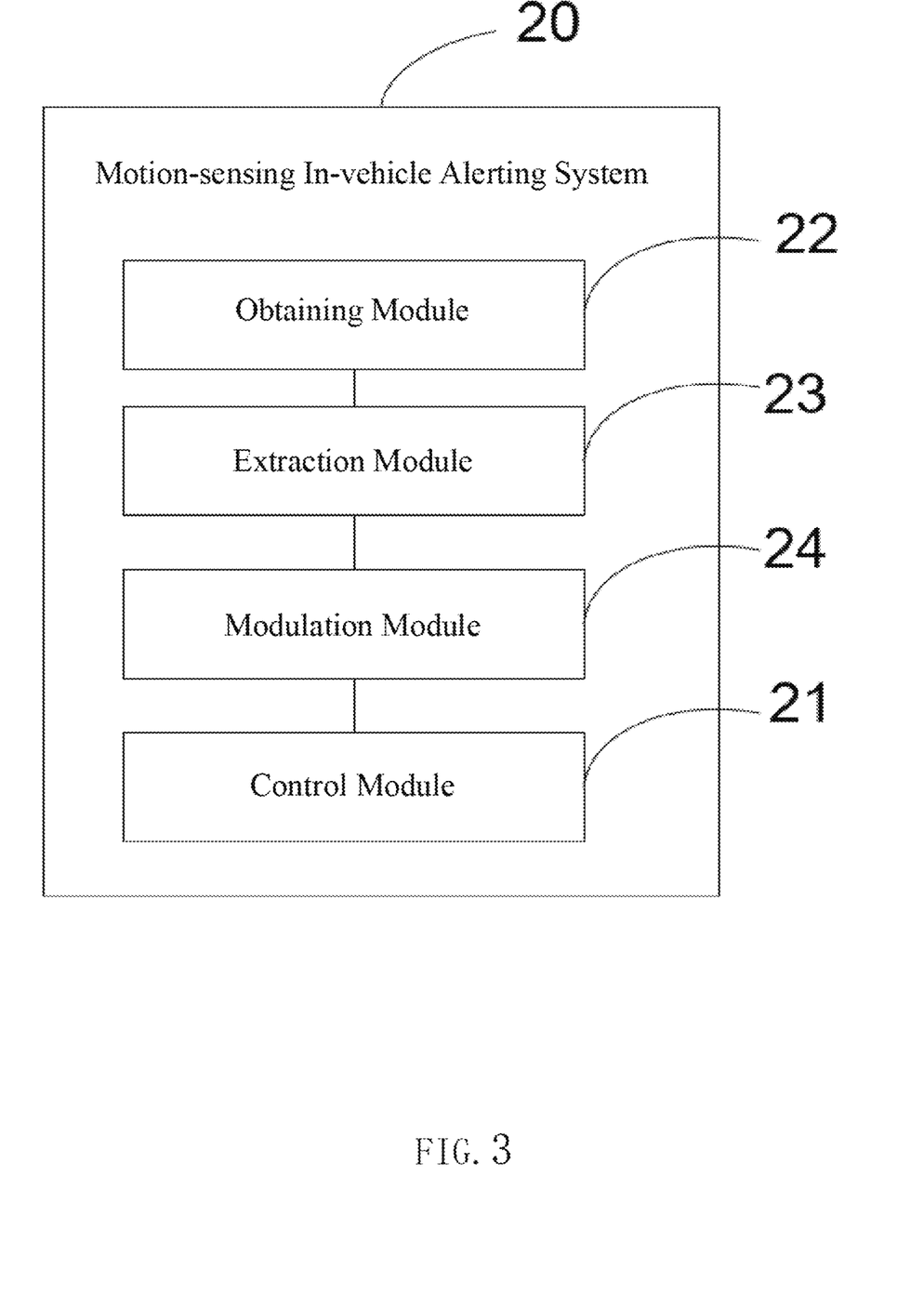
FIG. 3 is a structural block diagram of a control system for an in-vehicle independent voice coil according to an embodiment of the present application.

In the second aspect, referring to FIG. 3, FIG. 3 is a structural block diagram of a control system for an in-vehicle independent voice coil according to an embodiment of the present application.

Embodiments of the present application further provide a motion-sensing in-vehicle alerting system 20, applied to a vehicle with a preset excitation oscillator, the excitation oscillator being fixed to a seat 3 of the vehicle. The in-vehicle alerting system 20 includes an obtaining module 22, an extraction module 23, a modulation module 24, and a control module 21.

The obtaining module 22 is configured to obtain an audio signal from an in-vehicle audio bus 5 by a controller 4.

The extraction module 23 is configured to perform an acoustic characteristics analysis for the audio signal and extract an acoustic waveform of the audio signal in the time domain waveform.

The modulation module 24 is configured to perform an amplitude modulation for a sinusoidal signal of the acoustic waveform to obtain a modulated sinusoidal signal after amplitude modulation.

The control module 21 is configured to obtain a control signal indicating operational behavior information from the in-vehicle control bus 6 by the controller 4, match the control signal with the modulated sinusoidal signal according to predetermined rules to generate a vibration signal, and transmit the vibration signal to the excitation oscillator to achieve a vibration alert.

The combination of vibration alert with auditory alert not only enhances safety, but also, in the case of multiple excitation oscillators, allows for vibration alerts that are better aligned with user behavior through control signals on the in-vehicle control bus 6, resulting in an improved user experience.

Figure 4:
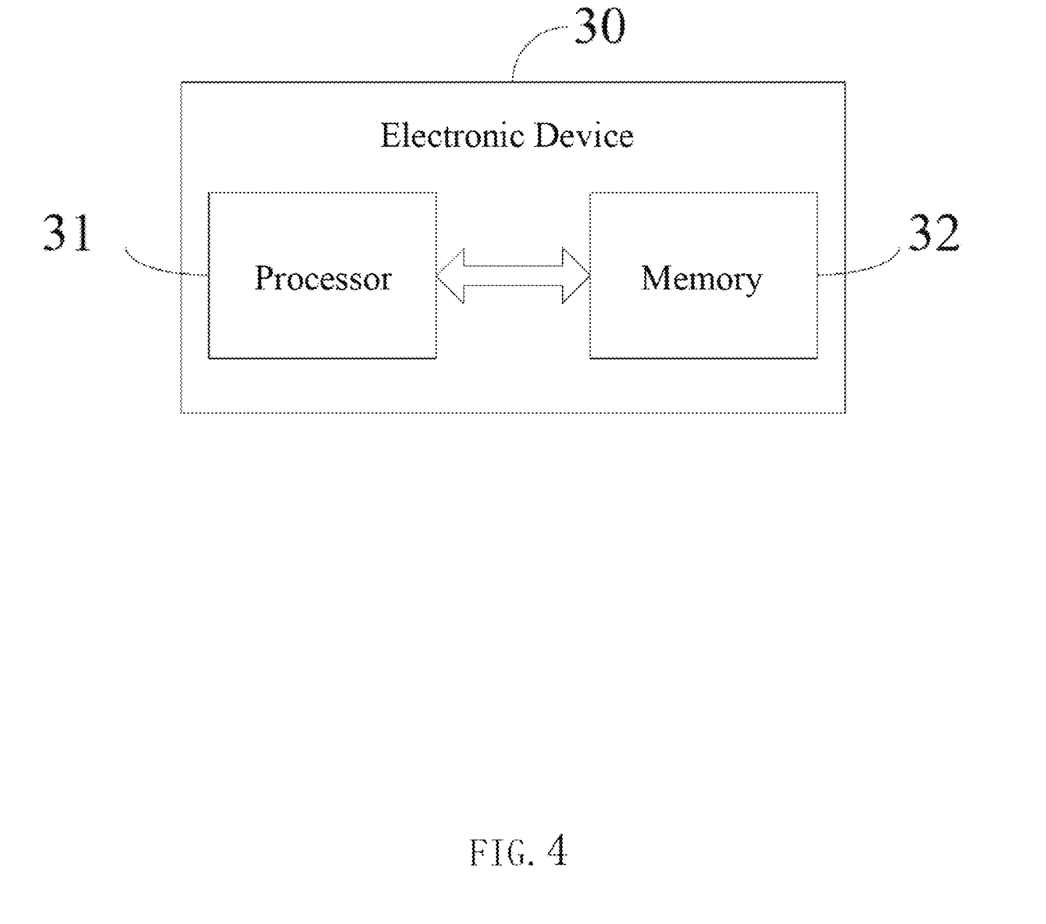
FIG. 4 is a structural diagram of an electronic device according to an embodiment of the present application.

In the third aspect, referring to FIG. 4, FIG. 4 is a structural diagram of an electronic device according to an embodiment of the present application.

Embodiments of the present application further provide an electronic device 30, including a processor 31 and a memory 32, the memory 32 having a computer program stored on the processor 31 that can be executed by the processor 31. The processor 31 reads the computer program in the memory 32 to execute the steps in the above-mentioned motion-sensing in-vehicle alerting method.

Specifically, the processor is configured to perform the following steps.

S1: an audio signal is obtained from the vehicle audio bus by the controller.

S2: an acoustic characteristics analysis is performed on the audio signal, and an acoustic waveform of the audio signal in the time domain waveform is extracted.

S3: an amplitude modulation is performed on a sinusoidal signal of the acoustic waveform to obtain a modulated sinusoidal signal after amplitude modulation.

S4: a control signal indicating operation behavior information is obtained from an in-vehicle control bus by the controller. The control signal is matched with the modulated sinusoidal signal according to predetermined rules to generate a vibration signal, and the vibration signal is transmitted to the excitation oscillator to achieve a vibration alert.

The electronic device provided by the embodiment of the present application is capable of realizing each embodiment of the method, and achieving the corresponding beneficial effects, which will not be repeated herein to avoid repetition.

In the fourth aspect, embodiments of the present application further provide a computer-readable storage medium. The computer-readable storage medium stores a computer program, the computer program is executed by a processor to achieve the steps in the above-mentioned motion-sensing in-vehicle alerting method. The computer-readable storage medium is capable of achieving the same technical effect, which will not be repeated herein to avoid repetition.

Those of ordinary skill in the art can understand that all or part of the process in the method of implementing the electronic device of the embodiments is possible to be implemented by a computer program to instruct the relevant hardware, and the program may be stored in a computer-readable storage medium. The program may include the process as in the respective embodiment of the method when executed. The storage medium may be a disk, CD-ROM, Read-Only Memory (ROM), or Random Access Memory (RAM).

Described above are only embodiments of the present application, but not to limit the scope of the patent of the present application. Any equivalent structure or equivalent process transformation made by using the specification of the present application and the accompanying drawings, or directly or indirectly applied in other related technical fields, are included in the protection scope of the patent of the present application in the same way.

What is claimed is:

1. A motion-sensing in-vehicle alerting method, applied to a vehicle with an excitation oscillator fixed to a seat of the vehicle, comprising:

obtaining, by a controller, an audio signal from an in-vehicle audio bus;

performing an acoustic characteristics analysis on the audio signal, and extracting an acoustic waveform of the audio signal in a time domain waveform;

performing an amplitude modulation on a sinusoidal signal of the acoustic waveform to obtain a modulated sinusoidal signal after amplitude modulation;

obtaining, by the controller, a control signal indicating operational behavior information from an in-vehicle control bus, matching the control signal with the modulated sinusoidal signal according to a predetermined rule to generate a vibration signal, and transmitting the vibration signal to the excitation oscillator to achieve a vibration alert.

2. The motion-sensing in-vehicle alerting method of claim 1, wherein in the step of obtaining, by the controller, the audio signal from the in-vehicle audio bus, the audio signal comprises a vehicle alert tone and a system alert tone in the vehicle.

3. The motion-sensing in-vehicle alerting method of claim 2, wherein the vehicle alert tone and the system alert tone comprise a notification alert tone, a system key tone, and a security alarm alert tone.

4. The motion-sensing in-vehicle alerting method of claim 1, wherein the step of performing the acoustic characteristics analysis on the audio signal, and extracting the acoustic waveform of the audio signal in the time domain waveform comprises:
   performing an acoustic envelope analysis on the audio signal; and
   extracting an envelope waveform of the audio signal on the time domain waveform.

5. The motion-sensing in-vehicle alerting method of claim 4, wherein in the step of extracting the envelope waveform of the audio signal on the time domain waveform, the extraction method satisfies the following expressions:

$$\text{Signal}_{Envelop}(t_0) = |\text{Signal}_{Audio}(t)|_{MAX}, t \in [t_0-\tau, t_0+\tau]. \quad (1)$$

$$\text{Signal}_{Envelop}^{All\ Range}(t_0) = \text{Signal}_{Audio}(t), t \in [0,T] \quad (2)$$

wherein $\text{Signal}_{Envelop}(t_0)$ represents an audio signal envelope at moment t0;
$\text{Signal}_{Audio}(t)$ represents the audio signal obtained from the in-vehicle audio bus by the controller;
$\tau$ represents a sampling interval of the audio signal on the time domain waveform;
$\text{Signal}_{Envelop}^{All\ Range}(t)$ represents the envelope waveform of the audio signal obtained from the in-vehicle audio bus by the controller on the time domain waveform; and
T represents a total duration of the audio signal obtained from the in-vehicle audio bus by the controller.

6. The motion-sensing in-vehicle alerting method of claim 5, wherein in the step of performing the amplitude modulation on the sinusoidal signal of the acoustic waveform to obtain the modulated sinusoidal signal after amplitude modulation, a method of amplitude modulation satisfies the following equation:

$$\text{Signal}_{mod}(f, t) = \text{Signal}_{sin}(f, t) * \frac{\text{Signal}_{Envelop}^{All\ Range}(t)}{\text{MAX}\left[\text{Signal}_{Envelop}^{All\ Range}(t)\right]}; \quad (3)$$

wherein $\text{Signal}_{mod}(f,t)$ represents the modulated sinusoidal signal after amplitude modulation;

f represents an operating frequency band of the excitation oscillator;
$\text{Signal}_{sin}(f,t)$ represents the sinusoidal signal before amplitude modulated; and
MAX [ ] represents a maximum value operation.

7. The motion-sensing in-vehicle alerting method of claim 1, wherein the excitation oscillator comprises a first excitation oscillator and a second excitation oscillator; the first excitation oscillator is fixed to one side of a bottom of the seat and the second excitation oscillator is fixed to the other side of the bottom of the seat; and the first excitation oscillator and the second excitation oscillator are electrically connected to an independent output channel of the controller, respectively.

8. The motion-sensing in-vehicle alerting method of claim 1, wherein the excitation oscillator is one or more of a moving coil vibrator, a moving iron vibrator, and a piezoelectric ceramic vibrator.

9. The motion-sensing in-vehicle alerting method of claim 8, wherein the vibration alert comprises a single-area vibration and a multi-area vibration;
   the single-area vibration is a vibration excited by one or more of the excitation oscillators; and
   the multi-area vibration is a vibration excited by different vibration signals transmitted to a plurality of the excitation oscillators.

10. A motion-sensing in-vehicle alerting system, applied to a vehicle with an excitation oscillator fixed to a seat of the vehicle, comprising an obtaining module, an extraction module, a modulation module, and a control module;
   the obtaining module is configured to obtain an audio signal from an in-vehicle audio bus by a controller;
   the extraction module is configured to perform an acoustic characteristics analysis for the audio signal, and extract an acoustic waveform of the audio signal in a time domain waveform;
   the modulation module is configured to perform an amplitude modulation for a sinusoidal signal of the acoustic waveform to obtain a modulated sinusoidal signal after amplitude modulation; and
   the control module is configured to obtain a control signal indicating operational behavior information from an in-vehicle control bus, match the control signal with the modulated sinusoidal signal according to a predetermined rule to generate a vibration signal and transmit the vibration signal to the excitation oscillator to achieve a vibration alert.

* * * * *